Feb. 9, 1971   S. C. PELLEGRINO   3,561,821
DUAL WHEEL WITH TIRE SEGMENTS
Filed Dec. 3, 1968
FIG. 1
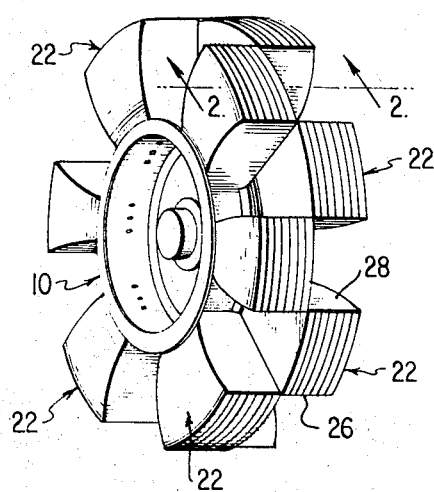
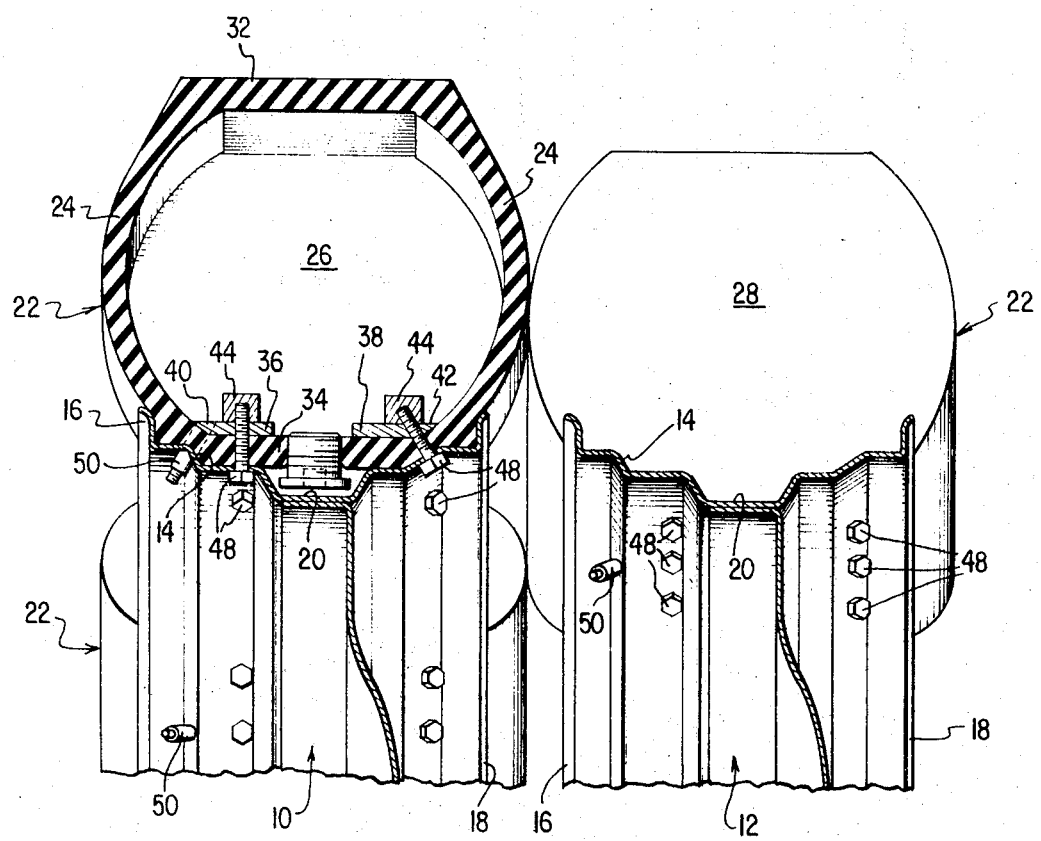
FIG. 2
INVENTOR
SAMUEL C. PELLEGRINO
BY
ATTORNEY

3,561,821
DUAL WHEEL WITH TIRE SEGMENTS
Samuel C. Pellegrino, 1297 Hertel Ave.,
Buffalo, N.Y. 14216
Filed Dec. 3, 1968, Ser. No. 780,810
Int. Cl. B60b *11/00*
U.S. Cl. 301—36          2 Claims

ABSTRACT OF THE DISCLOSURE

A dual wheel having adjacent rims having a drop center in which independently inflatable tire segments are in alternately staggered relation, whereby a single segment can be readily removed and repaired, the dual wheel tire provides improved traction on rough terrain and particularly in mud or loose soil, and provides a smooth bearing surface for passage over conventional road surfaces without damage to such road surfaces.

---

The primary objects of the present invention are to provide a novel wheel assembly; to provide a novel dual wheel assembly; and to provide a novel dual wheel assembly in which each wheel includes circumferentially spaced, independently inflatable and removable tire segments which provides a continuous running surface alternately from one tire segment to an adjacent one on the respective dual wheels.

These together with other and more specific objects and advantages will become apparent from a consideration of the following description when taken in conjunction with the drawing, in which:

FIG. 1 is a perspective view of the novel dual wheel; and

FIG. 2 is an enlarged framentary vertical section taken substantially on the plane of line 2—2 of FIG. 1.

Referring to the drawing in detail, two conventional wheels or rims 10 and 12 are detachably connected in juxtaposed parallel relation in any suitable manner. The wheels 10 and 12 are essentially identical, and would thus be interchangeable. Each of the wheels 10 and 12 includes a drop center rim 1c. Each rim includes an annular groove 14. The grooves 14 are flanked by annular flanges 16 and 18. Centrally, below groove 14, is a groove 20.

Circumferentially spaced about the wheels 10 and 12 are segment-shaped tire segments 22 which are disposed on 60° spaced radii and cover a radial span of approximately 30°. The tire segments 22 simulate a segmental portion of a conventional tire and include arcuate side walls 24, 26, joined by substantially planar transverse end walls 28 and 30 integral with an arcuate running surface, tread portion or outer wall 32 and an arcuate inner wall 34. The inner wall 34 is complementary to the drop center groove 14, and the walls 24–34 are conventionally made using cord plies, etc.

The tire segments are retained on the wheels by means of arcuate retention plates 36 and 38 having a beveled side 40, 42 disposed at the intersection of the inner wall 34 and side walls 26, 28 within the tire segments. The retention plates are suitably taped and have nut elements 44 secured thereto, and the rims have a series of apertures therethrough, and retention screws 48 secure the tire segments on the wheels or rims. The rims are also apertured to receive a conventional valve stem 50 therethrough. The inner wall 34 includes an inspection plug 52 integral therewith.

As previously mentioned, the wheels or rims are secured to each other on a vehicle axel in any conventional manner. The tire segments 22 on wheel 10, for example, are staggered 30° with respect to tire segments on wheel 12.

The outer wall or tread surface 22 of the tire segments 22 form a continuous running surface spanning 360° but alternating each 30° from one wheel to the other. Thus, when traversing an improved road surface, earth movers, tractors etc. would not noly run smoothly but minimum damage will be inflicted on the road surface. When a vehicle uses the dual tires of the present invention the 30° open spacing between end walls 28 and 30 of segments 22 on respective tires provides improved traction in muddy or soft soil. In the event one of the tire segments 22 is punctured or is worn, it can be readily replaced, and replacing only one unit 22 is considerably less expensive than replacing an entire tire.

Further, even though one tire segment is punctured, a substantial running surface is still available.

The wheels or rims 12 and 10 can be provided with additional apertures underlying the open spaces presently illustrated, and additional tire segments can be installed on a single wheel rim, thus providing a continuous running or tread surface. The drop center grooves aid to prevent segments 22 from being thrown when negotiating curves, for example.

What is claimed is as follows:

1. A dual wheel assembly comprising a pair of wheel rims, a plurality of tire segments removably secured on the wheel rims and disposed in circumferentially spaced relation, tire segments on respective wheel rims being staggered, the tire segments defining a continuous running surface continuously alternating from a tire segment of one wheel rim to the other,
   each of said tire segments including means permitting independent inflation,
   said wheel rims comprising drop center groove portions and said tire segments including a lower wall complementary and conforming to said drop center groove portion.

2. The structure as claimed in claim 1 in which each tire segment includes a pair of retention plates respectively extending circumferentially of said wheel at the intersection of an inner wall and side wall portion of said segments, each retention plate including a threaded nut portion thereon, and machine screws extending through said rim and engaging said nut portions for removably retaining the segments on said rims.

References Cited

UNITED STATES PATENTS

| | | | |
|---|---|---|---|
| 1,273,964 | 7/1918 | Webb | 152—376X |
| 1,658,426 | 2/1928 | Buffo | 152—334 |
| 2,074,284 | 3/1937 | Stevenson | 152—333X |
| 2,807,304 | 9/1957 | Pellegrino | 152—334X |

RICHARD J. JOHNSON, Primary Examiner

U.S. Cl. X.R.

152—334, 387; 301—5

UNITED STATES PATENT OFFICE
CERTIFICATE OF CORRECTION

Patent No. 3,561,821     Dated February 9th, 1971

Inventor(s)  S.C. PELLEGRINO

It is certified that error appears in the above-identified patent and that said Letters Patent are hereby corrected as shown below:

The patentee's address is as follows:

Samuel C. Pellegrino

220 St. Lawrence Avenue

Buffalo, N.Y. 14216

Signed and sealed this 13th day of July 1971.

(SEAL)
Attest:

EDWARD M. FLETCHER, JR.          WILLIAM E. SCHUYLER, JR
Attesting Officer              Commissioner of Patents